3,061,917
METHOD OF MENDING FILTER ELEMENTS AND PRODUCT THEREOF
David B. Pall, Roslyn Heights, N.Y., assignor to Pall Corporation, Glen Cove, N.Y., a corporation of New York
No Drawing. Filed Feb. 9, 1959, Ser. No. 791,848
10 Claims. (Cl. 29—401)

This invention relates to a method of mending mesh filter elements having an average pore diameter less than about 50 microns, and, more particularly, to a method of selectively collecting metal powder on a metallic fine mesh filter element to cover over excessively large apertures therein having diameters of the order of 150 microns or less, and bonding the powder into place, and to the filter elements obtained by this process.

It has been proposed heretofore, in U.S. Patent No. 2,457,051, to Le Clair, to prepare filters by sucking through a wire gauze or screen a suspension of metal particles larger in size than the mesh size of the gauze or screen, so that they are caught thereon, and then sinter-bonding this layer to the gauze or screen. This process relies upon the mesh as a filter to support the layer of powder, and this layer is intended to and does reduce the overall porosity of the base. It also increases the thickness of the base, and of the final filter. The fluid suspending medium is of quite low viscosity; the fluids disclosed are water and carbon tetrachloride. Because of these factors, the method as described in the patent is not practical for the mending of oversize holes, larger in diameter than the particles used to mend them, in filters of exceptionally small pore size, not larger than about 50 microns, down to 5 microns in diameter, and less. As a base layer, the patented process uses particles larger in diameter than the largest hole.

The preparation of mesh filter elements of such small pore size, with a high degree of uniformity and maximum structural rigidity, is described in copending U.S. applications Serial No. 562,127, filed January 30, 1956 now Patent No. 2,825,650, granted February 23, 1960 and Serial No. 671,586, filed July 12, 1957. In the preparation of these filters the contiguous portions of the filaments are flattened by rolling, pressing, or coining the filtering screen with pressure applied perpendicularly to its faces, thereby forming contiguous flattened areas at the contact surfaces of adjacent filaments. Maximum structural rigidity is imparted by sinter-bonding the wire mesh filaments at their points of contact.

In order to provide maximum surface area in a small space, the filter screens are corrugated, pleated, or folded into a variety of shapes. Corrugated, pleated, or folded filter elements having deep corrugations present a greater effective filter area and posses a greater capacity for impurities than those having shallower corrugations.

Unfortunately, however, the pleating corrugating, or folding of the screens, and subsequent operations required to assemble them into a finished filter element joined to an appropriate connection at one end, and generally with an appropriate closure at the opposite end, is nearly always accompanied by the introduction of abnormally large apertures. For example, after corrugating the screen, the corrugated structure is rolled to form a cylinder and the ends of the screen welded together; this axial weld is often not perfect so that abnormally large apertures, will generally be found in this weld. Similarly, when the ends of the corrugated cylinder are welded to the appropriate end fittings, apertures are found to exist due to incomplete welding. In one of the most useful methods for assembling end connections to a corrugated cylinder, the corrugations are compressed locally at the ends to form at high density structure in order to facilitate welding to the end connections. During the densification operation, some large apertures tend to be developed in the screen, particularly in the location of the axial weld. The result is that, with a mesh having a nominal opening of 13 microns, for example, the assembled filter element may have a large number of apertures greater than 15 microns when assembled caused by faults both originally present in the mesh and introduced during the corrugating and sintering operations. Inasmuch as the formation of these oversize holes can not be avoided, it is necessary to mend them in order to produce a filter having the desired maximum pore opening. Heretofore this mending has required a separate hand operation for each pore, which is both expensive and slow and considerably reduces the rate of production of filters of this type, effectively limiting their usefulness to special applications where cost is not a factor.

Furthermore, no method has heretofore been developed for closing such apertures with an all stainless structure. For example, when the aperture occurs in the internal portions of a fold of the filter element, it is not accessible for welding, or for repair, by an other means known at this time by which an all stainless steel overlay can be applied. For this reason, it has been necessary to resort to such methods as applications for resinous materials, brazing alloys of composition different from the parent material, and other similar methods to accomplish such repairs, obviously less desirable than all-stainless steel repair method.

In accordance with the invention, therefore, a method is provided for mending the oversize holes in fine mesh filter elements having an average pore diameter less than about 50 microns rapidly and without substantial reduction of the porosity of the filter or increase in the overall size of the filter. Powdered material capable of being sinter-bonded to the filaments of the mesh filter, and preferably of the same composition as the material forming the filaments, is suspended in a fluid or medium of higher viscosity, and the resulting suspension is drawn through the filter element, in the course of which the powder is deposited in the oversize holes. When the holes have been reduced in size to the predetermined maximum, the liquid is removed and the powder is then sinter-bonded to the mesh filter. By appropriate selection of the particle size and amount of the powder, it is possible to selectively plug or mend the excessively large holes in the filter without seriously reducing the porosity of the filter element, even though the particles are not more than half the diameter of the oversize hole. This favorable result is believed to be due to the viscosity of the suspending fluid.

The process of the invention is applicable to mesh filters formed of any metal but is particularly useful in mending filters made of stainless steel mesh. The use of stainless steel powder in mending such a filter makes possible a product of uniform porosity, very desirable acid resistance, and high strength. It is also possible to apply the process of the invention to mesh filters of copper, brass, iron, nickel, aluminum, and titanium and various alloys, all of which are well known to those skilled in the art.

Normally, the metal powder used for mending is of the same metal as the filaments of the mesh filter. However, this is not essential and special effects can be obtained by applying a powder of a different metal or alloy to the mesh filter base.

The particle size of the powder is not critical. Surprisingly, powder much smaller in particle size than the diameter of the largest openings in the filter which are to be closed over will collect at the larger holes which are to be mended. For example, holes as large as 100 microns in diameter will be completely closed over, using suspensions of particles 90% or more of which are in the size range 30 to 50 microns. The reason for the efficiency of these suspensions in closing over the large apertures is thought to be as follows: When the powder suspension is drawn through the filter, a greater proportion of the suspension can and does flow through openings of larger size, with the result that a number of particles reaching the opening at the same time will wedge or "jam" over the opening, after which subsequent particles reaching this area will coat it with a thickness of powder substantially equal to that which is collected on the other surfaces of the filter element.

It will be seen from this that in addition to the particle size of the powder used, the reduction in porosity of the filter is a function of the rate of flow of the suspension through the filter and of the time allotted to the mending operation together with the total content of particles suspended in the solution. Because of the interdependence of these factors on each other and upon the diameter of the openings in the screen, it is impossible to set forth any exact conditions which are applicable to every type of filter. It will be apparent, however, that very little experimentation will be needed to select conditions appropriate to the need.

The most desirable coating thickness has been found to be represented by a coating of which the weight in grams per square foot is approximately equal to the particle size range of the powder used. For example, when the powder used is in the range 30 to 50 microns, the best results are obtained by applying 30 to 50 grams per square foot of filter area. Applying less than this quantity tends to allow large openings to remain open; applying more than this amount merely decreases permeability to fluids with no accompanying benefit.

The particle size of the powder suspension used for accomplishing the repair can be such that the powder collected on the filter surface does not greatly change permeability or filtration characteristics. It is equally possible by use of an appropriate powder size, relative to the pore diameter of the filter, to diminish the average pore diameter of the filter, whereby a finer overall filter structure is obtained.

Mesh filters tend to lose their usefulness, due to development of excessively high pressure drop, when actual hole size falls below 8 microns. Hence, while this invention can include filters while hole size below 8 microns, in practice it is usually not applied outside the range of actual hole size equal to 8 to 50 microns.

In general, it can be said that the powder particles may have a maximum diameter not less than half the diameter of the largest oversize opening in the screen, but usually not in excess of about 75 microns, and they should be up to about five times the average diameter of the normal size pore openings in the screen. The lower limit is not critical. The particles can be smaller than the average screen pore diameter, if the oversize openings are relatively small. The process of the invention can be used to repair holes from five to ten times the diameter of the average hole in a filter. For a normal hole size of 20 microns, all holes present in a filter element larger than approximately 100 and some up to 200 microns can be repaired. However, if a hole is present in the element which is 300 microns or more in diameter, the repair method would not be effective in closing over this particular hole, but this hole could be closed manually. Hence, a substantial advantage is still obtained by applying the method to elements having a few holes considerably larger than the largest repairable by the method, since the amount of time required for manual repair of the element is substantially reduced by the elimination of all holes smaller than the very largest ones.

The concentration of powder in the suspension should be within the range from 0.25 to 5.0%, preferably from 0.5 to 2.5%.

The viscosity of the suspension is of importance, and should be considerably greater than the viscosity of water. Viscosities within the range of 2 to 1000 centipoises, measured at the temperature of application, have been found to be partially satisfactory. Preferably, the viscosity is from 10 to 100 centipoises for best results. The process has been conducted, although with a considerably less satisfactory product, using fluids with viscosities as low as one centipoise. When viscosity is too low, holes which would otherwise be closed over tend to remain open, and in addition the coating tends to be very non-uniform, yielding a far less satisfactory product.

The fluid used to suspend the power may be one which has too low a viscosity at room temperature, but which has the desired viscosity at low temperature. If the powder is suspended in such a fluid and cooled to low temperature and the then viscous fluid is passed through the filter element, the advantages of the high viscosity are obtained. When the required amount of fluid suspension has been passed through the filter element, the filter element can be removed and warm air passed through it while it is sucked dry. In this way, a minimum of fluid is retained in the filter element, since the viscosity of fluid at the end of the drying operation is low. Similarly, a suspension in a fluid having the desired moderate to high viscosity at room temperature can be used, and the element subsequently sucked dry by passing hot air through it, whereby the viscosity of the suspending solution is substantially reduced.

The fluid can be an organic liquid which has the requisite viscosity at the temperature of operation, such as ethylene glycol, glycerin, polyethylene, and polypropylene glycols of low to medium molecular weight, and motor lubricating oils derived from petroleum, SAE 20 to 50. The fluid also can be one of too low viscosity, such as water or low viscosity lubricating oil, whose consistency is increased by a thickening agent.

Any viscosity-increasing agent soluble in the fluid can be used. Carboxymethyl cellulose, methyl cellulose, hydroxyethyl cellulose and similar water-soluble cellulosic derivatives are quite satisfactory. Water-soluble gums, such as the alginates, locust bean gum, guar gum and carob gum, are also satisfactory. Water-soluble synthetic resins can also be used. Polyacrylic acid, polymethylacrylic acid, polymethylmethacrylic acid and polymethacrylic acid, polyvinyl alcohol, partially hydrolyzed polyvinyl acetate and polyacrylamide are quite satisfactory. Oil-soluble polymeric viscosity increasers such as Paratac and Vistanex also are useful.

The powder suspension is readily prepared by suspending the powder in the desired amount in the previously prepared viscous fluid. It is very important to obtain uniformity so as to insure even deposition upon the mesh filter. Mechanical stirring is quite desirable and the stirring apparatus should be quite efficient and reach every portion of the solution to insure uniformity.

The powder suspension can be drawn through the mesh filter either horizontally or vertically. Downward flow is possible but it is preferable to conduct the deposition by upward flow through the filter at a rate exceeding the settling rate of the metal powder in the solution.

Subsequent to drying, the coated filter is passed through a furnace in reducing atmosphere, at a temperature below the melting point of the metal of which the element is composed. If two metals are present, the melting point of the lower melting metal is the upper limit.

When the fluid and/or thickening material employed is organic in nature, it contains a substantial proportion of carbon. If a significant amount of the suspending fluid is allowed to remain upon metal powder, in the case of stainless steel and other metals, some of the carbon can be picked up by the metal during sintering. This is particularly undesirable in the case of stainless steel since the metal then becomes sensitized to intergranular corrosion because of its high carbon content.

In order to avoid this, the fluid can be washed from the powder before sintering simply by drawing water or ethyl alcohol or other low viscosity solvent therefor through the assembly. The powder remains sufficiently adhered in position to permit normal handling of the filter until sintering is complete. A solvent for the thickening agent can be used to wash out the agent, with the same result.

The washing step in unnecessary when there is little holdup or when the thickening agent is used in a small concentration, less than about 0.2%. The amount of agent remaining on the surface of the powder and, correspondingly, the amount of carbon added to the stainless steel, is then so small as to be truly negligible.

No powder is collected on non-porous portions of the filter element. The finished structure presents a very neat appearance, due to absence of resin repair areas or of brazed areas.

Suspensions in fluids having viscosities as low as that of water, or suspensions in water itself, give coatings which are non-uniform, compared to those obtained using the more viscous solutions of the invention.

An important characteristic of filter elements is dirt capacity. A specific definition of dirt capacity is provided by Military Specification Mil–F–5504A, in which Standard U.S. Army Air Cleaner Test Dust (A.C. first test sheet) is suspended in hydraulic fluid and passed through the filter element until a differential pressure of 40 p.s.i. is reached.

Inasmuch as the metal particles deposited on the filaments of a filter provide a large surface area on which impurities can be trapped, filters prepared according to this invention have a much higher dirt capacity than has the starting material. In many cases, the dirt capacity of a filter is increased by a factor of five by the use of this process, in spite of the fact that the starting (clean) pressure drop across the coated filter element is higher than the uncoated element. In addition, because the diameter of the largest openings is reduced, removal of smaller impurities is possible. Because of the improved dirt capacity, it has been found possible to design filters prepared in accordance with the invention for use in hydraulic systems for a period of a year or more without cleaning.

The following example is illustrative:

*Example*

A filter element was prepared in accordance with U.S. application Serial No. 562,127, composed of stainless steel mesh having an average opening diameter of 13 microns, and having a filter area of 0.2 square feet. This filter was tested by the Bubble Point Test described in WADC Technical Report 56–249 entitled "Development of Filters for 400° F. and 600° F. Aircraft Hydraulic Systems" (Wright Air Development Center, May 1956) and was found to have approximately twenty holes ranging from 30 to 100 microns in diameter.

An aqueous solution of polyacrylic acid (C934–Goodrite) was prepared. The resulting solution has a viscosity of 5 centipoises at 25° C., the room temperature of operation, as determined by a capillary viscometer. To the solution was added stainless steel powder ranging from 30 to 50 microns in diameter to form a 2.5% suspension by weight in the solution.

While being strongly agitated, this suspension was drawn through the mesh filter upwardly at a rate of 4 gallons per minute for fifteen seconds, after which air was sucked through the filter for about 10 seconds, and the element then was dried. Thereafter the composite filter element was sinter-bonded at 1270° C. The finished filter was subjected to the Bubble Point Test again. The largest opening was then found to be 15 microns in diameter.

Initially, the pressure drop across the filter when passing 4.2 gallons per minute of hydraulic fluid was 6 p.s.i.; the pressure drop across the finished filter was 9.5 p.s.i.

Dirt capacity measurements were made on the filter element using the procedure of Military Specification No. MIL–F–5504 and proposed Specification MIL–F–8815. U.S. Army Standard fine air cleaner test dust was added while flowing MIL–H–5606 hydraulic fluid through the element at 4.2 p.s.i. until a differential pressure of 40 p.s.i. was developed. The dirt capacity of the finished filter was found to be approximately one and one half times as great as that of the starting filter. When the test was continued up to 90 p.s.i. differential, a figure which is proposed for use in Military Specification MIL–F–8815, the dirt capacity after repair was approximately twice that before repair.

The removal efficiency of the final finished filter measured in accordance with the procedure of proposed Military Specification MIL–F–8815 was 96% compared with approximately 75% for filters made of the same mesh in the same way except mended using localized applications of epoxy resin to areas having oversize holes. When elements were made up using a finer starting mesh, such that after repair by the resin method they had efficiency equal to 94%, they had approximately one-fifth of the dirt capacity of elements repaired using the powder suspension method described herein.

This application is a continuation-in-part of Serial No. 562,127, filed January 30, 1956 now U.S. Patent No. 2,925,650, issued on February 23, 1960 and Serial No. 671,586, filed July 12, 1957.

I claim:

1. A method for mending oversize openings and increasing dirt capacity in a mesh filter element having an average hole size between 8 and 50 microns and oversize holes up to ten times the average hole size, comprising passing through the filter a fluid suspension having a viscosity within the range from 2 to 1000 centipoises at the temperature of operation consisting of powder particles smaller than the largest oversize openings and having a maximum diameter not less than half the diameter of the largest oversize opening, depositing particles preferentially in said openings, until said openings are reduced in diameter, and sintering the deposited particles so that they are bonded to the mesh filter.

2. A method according to claim 1 wherein the suspension has a viscosity within the range from 10 to 100 centipoises.

3. A method according to claim 1 in which the mesh filter is washed to remove excess fluid from the particles before drying and sintering.

4. A method according to claim 1 in which the mesh filter and the powder are of metal.

5. A method according to claim 4 in which the mesh filter and the powder are of the same metal.

6. A method according to claim 4 in which the mesh filter and the powder are of stainless steel.

7. A method according to claim 1 in which the suspension is an aqueous suspension thickened by a water-soluble organic thickener.

8. A method according to claim 7 in which the organic thickener is water-soluble gum.

9. A method according to claim 7 in which the organic thickener is a cellulose derivative.

10. A method according to claim 7 in which the organic thickener is polyacrylic acid.

References Cited in the file of this patent

UNITED STATES PATENTS

| | | |
|---|---|---|
| 2,159,231 | Schlecht | May 23, 1939 |
| 2,297,817 | Truxell | Oct. 6, 1942 |
| 2,390,160 | Marvin | Dec. 4, 1945 |
| 2,450,339 | Hensel | Sept. 28, 1948 |
| 2,454,982 | Wallace | Nov. 30, 1948 |
| 2,457,051 | Le Clair | Dec. 21, 1948 |
| 2,877,903 | Veres | Mar. 17, 1959 |
| 2,925,650 | Pall | Feb. 23, 1960 |